Figures 1, 2:
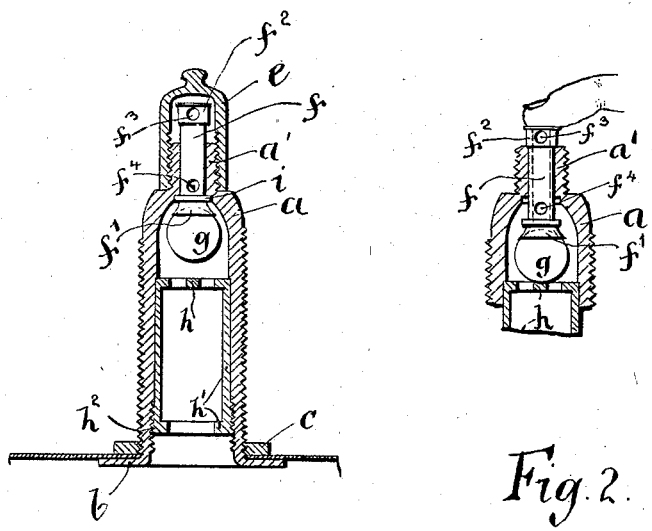

No. 637,919.  
O. J. BROWN.  
VALVE FOR PNEUMATIC TIRES, &c.  
(Application filed May 20, 1898.)

Patented Nov. 28, 1899.

(No Model.)

Witnesses  
John F. Gauns  
Albert E. Ellen.

Inventor  
O. J. Brown  
per George Henry Rayner  
Attorney

UNITED STATES PATENT OFFICE.

OWEN JAMES BROWN, OF MANCHESTER, ENGLAND.

VALVE FOR PNEUMATIC TIRES, &c.

SPECIFICATION forming part of Letters Patent No. 637,919, dated November 28, 1899.

Application filed May 20, 1898. Serial No. 681,241. (No model.)

*To all whom it may concern:*

Be it known that I, OWEN JAMES BROWN, watch-manufacturer, a subject of the Queen of Great Britain and Ireland, residing at 2 Bramley street, Manchester, England, have invented a certain new or Improved Valve for Use in Pneumatic Tires and the Like, of which the following is a specification.

This invention relates to an improved valve for use with pneumatic tires and the like; and its object is to provide a valve which will allow the tire to be easily inflated without any danger of the air escaping.

In order to more clearly describe this invention, reference is had to the accompanying drawings, in which—

Figure 1 is a section of a valve constructed according to this invention and to an enlarged scale. Fig. 2 is a similar view showing the method of operating the valve to deflate the tire.

The stem $a$ is screw-threaded externally and fixed by means of the extension $b$ and nut $c$ to the tire in the usual manner. The stem $a$ is provided with a similar screwed extension $a'$ at its end adapted to receive a cap $e$ when the valve is closed or to receive the end of the pump while the tire is being inflated in a manner well understood. The tube $f$ is fitted within the stem $a'$ and is placed loosely in position, so that it is capable of sliding up and down to a certain extent. The lower end $f'$ of this sliding tube $f$ is concave or hollowed out, and a small rubber ball $g$ is placed within the stem $a$ and is adapted to fit in the said concave or hollowed-out end $f'$ of the sliding tube $f$. The end $f^2$ of the sliding tube $f$ is somewhat enlarged, and, together with the end $f'$, prevents the tube $f$ from sliding entirely into or out of the stem $a$.

Within the lower portion of the stem $a$ an internal grating $h$ is fitted. A convenient means for attaching this grating is by forming it upon a casing $h'$, having at its lower end a screwed ring $h^2$, adapted to screw into the lower end of the stem $a$. Any other suitable means for securing the grating $h$ in position may, however, be employed without departing from this invention. Openings $f^3$ $f^4$ are formed in the sliding tube $f$, and a rubber ring $i$ is arranged in a recess upon the said tube $f$, so as to insure an air-tight fitting thereof. This ring bears against the interior surface of the stem $a$, as shown, when the sliding tube $f$ is in its top position. When it is desired to inflate the tire, the pump is fitted upon the extension $a'$, and the pump is operated to force air into the tire in the usual manner. As soon as the pumping ceases the ball $g$ is forced up by the air-pressure into the concave or hollowed-out end $f'$, and the ball and tube are forced to the upper position. The openings $f^4$ at the lower end of the tube $f$ are then situated within the extension $a'$, and no air can escape through them, the rubber ring $i$ closing all communication. The pump can then be removed, and it will be readily understood that the valve is entirely closed.

To deflate the tire, the tube $f$ is pressed inward with the finger, as shown in Fig. 2, and air can then escape through the openings $f^3$ $f^4$. During deflation the ball $g$ is kept in the end $f'$ of the tube $f$ until there is no pressure within the tire, when it will fall onto the grating $h$.

What I claim as my invention, and desire to secure by Letters Patent, is—

1. In a valve for pneumatic tires, a stem adapted to be attached to the tire and having upon its upper end a threaded extension to which the pump or a cap is adapted to be attached, a tube within said extension provided with openings near each end, and having its lower end concaved or hollowed out, a rubber ball adapted to fit within said concave or hollowed-out end, and a grating secured within the stem, substantially as and for the purposes specified.

2. In a valve for pneumatic tires, a stem $a$ adapted to be secured to the tire and having an extension $a'$, the tube $f$ adapted to slide within said extension $a'$ and provided with the openings $f^3$ and $f^4$, its end $f'$ being concaved or hollowed out, ball $g$ which can fit within the end $f'$ of the tube $f$, grating $h$ fitted within the stem $a$, and rubber ring $i$ substantially as described and for the purposes specified.

3. In a valve for pneumatic tires, stem $a$, extension $a'$, lower extension $b$, nut $c$, cap $e$, tube $f$ having concave or hollowed-out end $f'$ enlarged end $f^2$, and openings $f^3$ $f^4$, rubber ball $g$, grating $h$ and rubber ring $i$ all arranged and operating substantially as described with reference to the drawings.

In witness whereof I have sworn and set my hand in the presence of two witnesses.

OWEN JAMES BROWN.

In presence of—
FRANK RUSSELL,
JAMES JOSEPH MALLON.